W. E. MILLER.
Carriage-Axle.

No. 200,214.　　　　　Patented Feb. 12, 1878.

Witnesses.
J. H. Shumway

Willis E. Miller
Inventor
By Atty.
John E. Earl

UNITED STATES PATENT OFFICE.

WILLIS E. MILLER, OF NEW HAVEN, CONNECTICUT.

IMPROVEMENT IN CARRIAGE-AXLES.

Specification forming part of Letters Patent No. 200,214, dated February 12, 1878; application filed November 30, 1877.

*To all whom it may concern:*

Be it known that I, WILLIS E. MILLER, of New Haven, in the county of New Haven, and State of Connecticut, have invented a new Improvement in Carriage-Axles; and I do hereby declare the following, when taken in connection with the accompanying drawings and the letters of reference marked thereon, to be a full, clear, and exact description of the same, and which said drawings constitute part of this specification, and represent, in—

Figure 1:
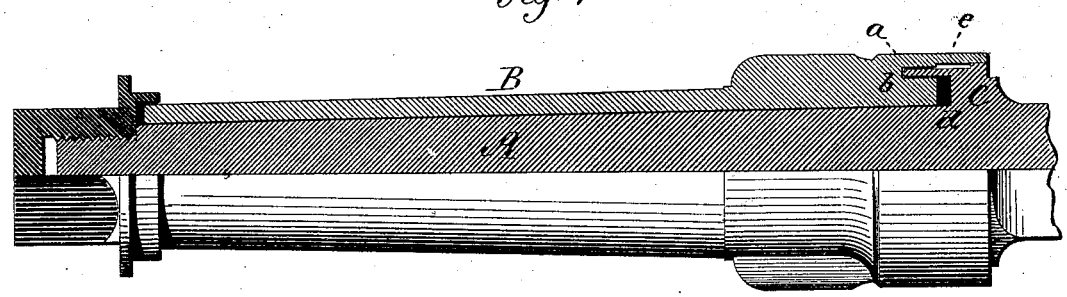
Figure 2:
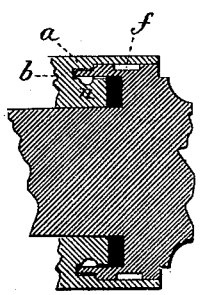

Figure 1, a longitudinal view, partly in section; Fig. 2, a modification of the same.

This invention relates to an improvement in carriage axles and boxes, the object being to protect the axle against dust and other foreign substances which naturally work between the box and axle; and it consists in the peculiar construction hereinafter described, and more particularly recited in the claim.

A is the arm of the axle, of any desirable form; B, the box. C, the collar on the axle, is grooved out on its front side, so as to form a flange, *a*, projecting forward parallel with the axis. The box is constructed so as to pass on over the collar, in the usual manner, and in the shoulder a groove, *b*, is formed, corresponding to the flange *a* on the axle. A packing, *d*, is placed within the flange *a*, so that the shoulder on the box will run close against the said packing. An annular space, *e*, is left between the collar C and the portion of the box projecting thereover by forming a raised rib on the collar and extending the shoulder of the box outward beyond the groove *b*.

Should any dust or foreign substance enter between the box and the collar, it must traverse around the flange *a* and downward, returning through the groove within the flange past the packing before it can reach the axle. This long circuitous route prevents the possibility of such foreign substance reaching the axle.

Generally the space *e* between the flange and the outer end of the collar will retain all the foreign substance that may enter. This construction not only prevents the entering of foreign substances, but equally prevents the escape or working out of oil from the box.

Instead of forming the recess *e* by a shoulder on the box and rib on the collar, it may be done by simply turning a groove into the collar, as at *f*, Fig. 2.

An additional protection may be made by forming an annular groove, *n*, within the groove *b*, as seen in Fig. 2, which would receive and retain any foreign substance which might pass the flange *a*.

I do not broadly claim an axle constructed with a flange projecting forward from its collar, and the box with corresponding groove to set onto said flange, as such, I am aware, is not new. Neither do I claim an annular groove within the collar of itself, as I am aware that this is not new.

I claim—

The combination of an axle-arm the collar of which is constructed with a flange projecting forward parallel with the axis, and a box constructed with a groove corresponding to said flange, and so as to extend over the said collar, with an annular recess between the said collar and the box, substantially as described.

WILLIS E. MILLER.

Witnesses:
JOHN E. EARLE,
H. A. KITSON.